US008050821B2

(12) United States Patent
Morris et al.

(10) Patent No.: US 8,050,821 B2
(45) Date of Patent: Nov. 1, 2011

(54) APPARATUS AND METHOD FOR REGULATING HYBRID ACTIVE DAMPING STATE ESTIMATOR

(75) Inventors: Robert L. Morris, Milford, MI (US); R. Anthony Hansen, Redford, MI (US); Michael D. Haggerty, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 507 days.

(21) Appl. No.: 12/326,941

(22) Filed: Dec. 3, 2008

(65) Prior Publication Data
US 2010/0138107 A1 Jun. 3, 2010

(51) Int. Cl.
*B60G 17/016* (2006.01)
*B60G 17/0195* (2006.01)

(52) U.S. Cl. ............ 701/37; 701/39; 701/48; 280/5.519

(58) Field of Classification Search .......... 701/1, 36–40, 701/48, 50; 280/5.5–5.524; 700/28
See application file for complete search history.

(56) References Cited

U.S. PATENT DOCUMENTS

| | | | | |
|---|---|---|---|---|
| 4,564,215 A * | 1/1986 | Kumagai et al. | ........... | 280/5.519 |
| 4,881,172 A * | 11/1989 | Miller | ............... | 701/37 |
| 5,062,657 A * | 11/1991 | Majeed | ........................ | 280/5.503 |
| 5,063,512 A * | 11/1991 | Kamimura et al. | .............. | 701/37 |
| 5,188,390 A * | 2/1993 | Clark | ........................ | 280/5.501 |
| 5,324,066 A * | 6/1994 | Masamura et al. | ......... | 280/5.519 |
| 5,390,121 A * | 2/1995 | Wolfe | .............................. | 701/37 |
| 5,434,782 A * | 7/1995 | Henry | ............................. | 701/37 |
| 5,550,739 A * | 8/1996 | Hoffmann et al. | .............. | 701/37 |
| 5,572,425 A * | 11/1996 | Levitt et al. | ...................... | 701/37 |
| 5,609,353 A * | 3/1997 | Watson | ........................ | 280/5.516 |
| 5,732,370 A * | 3/1998 | Boyle et al. | ...................... | 701/37 |
| 6,202,011 B1 * | 3/2001 | Jeon | ................................. | 701/37 |
| 6,311,110 B1 * | 10/2001 | Ivers et al. | ....................... | 701/37 |
| 6,801,810 B1 * | 10/2004 | Poncet | ............................ | 700/12 |
| 6,816,764 B2 * | 11/2004 | Coelingh et al. | ................ | 701/37 |
| 6,898,501 B2 * | 5/2005 | Schubert | ......................... | 701/50 |
| 6,953,409 B2 | 10/2005 | Schmidt et al. | | |
| 7,033,303 B2 * | 4/2006 | Takasaki et al. | ................. | 477/97 |
| 7,315,774 B2 | 1/2008 | Morris | | |
| 7,380,800 B2 * | 6/2008 | Klees | ........................... | 280/5.519 |
| 7,571,044 B2 * | 8/2009 | Brown et al. | ................... | 701/91 |
| 7,739,016 B2 * | 6/2010 | Morris | ............................ | 701/51 |
| 2007/0225886 A1 | 9/2007 | Morris | | |
| 2007/0225887 A1 | 9/2007 | Morris | | |

OTHER PUBLICATIONS

Ali et al., On the Tuning of Nonlinear Model Predictive Control Algorithms, Jun. 1993, American Control Conference '93, pp. 786-790.*

* cited by examiner

*Primary Examiner* — Thomas Black
*Assistant Examiner* — Lindsay M Browder
(74) *Attorney, Agent, or Firm* — Quinn Law Group, PLLC

(57) ABSTRACT

The present invention provides an improved method and apparatus for regulating state variable estimators used in a hybrid active damping system for a vehicle powertrain. The state estimator provides variable estimates for operating states, such as real-time torque values of axles and dampers, that are not readily measurable with production powertrain and driveline hardware. This facilitates implementation of other control algorithms, such as torque oscillation damping control schemes which use multivariable feedback. The apparatus and method monitors the operating mode of the powertrain, and resets the state estimator for the hybrid active damping ring (HADR) under predetermined operating conditions. For instance, the state estimator includes an array of current state and predicted state variables that are set equal to corresponding reference values or measured values if the powertrain enters into four-wheel drive low (4WDLO).

15 Claims, 6 Drawing Sheets

APPARATUS AND METHOD FOR REGULATING HYBRID ACTIVE DAMPING STATE ESTIMATOR

TECHNICAL FIELD

The present invention relates generally to hybrid powertrain control systems, and more specifically to state variable estimators used in active driveline damping systems for such hybrid powertrains.

BACKGROUND OF THE INVENTION

Most conventional motor vehicles, such as the modern-day automobile, include a powertrain (sometimes referred to as "drivetrain") that is generally comprised of an engine that delivers driving power through a multi-speed power transmission to a final drive system, such as a rear differential, axle, and wheels. Automobiles have traditionally been powered solely by a reciprocating-piston type internal combustion engine (ICE) because of its ready availability and relative cost, weight, and efficiency. Such engines include 4-stroke compression-ignited diesel engines and 4-stroke spark-ignited gasoline engines.

Hybrid vehicles, on the other hand, utilize alternative power sources to propel the vehicle, minimizing reliance on the engine for power, thereby increasing overall fuel economy. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles can be turned off while the vehicle is propelled by the alternative power source(s).

Series hybrid architectures, sometimes referred to as Range-Extended Electric Vehicles (REEVs), are generally characterized by an internal combustion engine in driving communication with an electric generator. The electric generator, in turn, provides power to one or more electric motors that operate to rotate the final drive members. In effect, there is no direct mechanical connection between the engine and the drive members in a series hybrid powertrain. The lack of a mechanical link between the engine and wheels allows the engine to be run at a constant and efficient rate, even as vehicle speed changes—closer to the theoretical limit of 37%, rather than the normal average of 20%. The electric generator may also operate in a motoring mode to provide a starting function to the internal combustion engine. This system may also allow the electric motor(s) to recover energy from slowing the vehicle and storing it in the battery by regenerative braking.

Parallel hybrid architectures are generally characterized by an internal combustion engine and one or more electric motor/generator assemblies, each of which has a direct mechanical coupling to the power transmission. Most parallel hybrid designs combine a large electrical generator and a motor into one unit, providing tractive power and replacing both the conventional starter motor and the alternator. One such parallel hybrid powertrain architecture comprises a two-mode, compound-split, electro-mechanical transmission which utilizes an input member for receiving power from the ICE, and an output member for delivering power from the transmission to the driveshaft. First and second motor/generators operate to rotate the transmission output shaft. The motor/generators are electrically connected to an energy storage device for interchanging electrical power between the storage device and the first and second motor/generators. A control unit is provided for regulating the electrical power interchange between the energy storage device and motor/generators, as well as the electrical power interchange between the first and second motor/generators.

Regardless of architecture, most hybrid powertrains generate driveline vibrations during normal operation, which range from imperceptible to unpleasantly noticeable. Significant driveline vibrations may be objectionable to a vehicle operator, and may reduce service life of the driveline components. Historically, driveline vibrations are mitigated by implementing systems which operate to cancel torque oscillations at one specific frequency, over a range of frequencies, or a set of frequencies chosen based upon gear ratio at which the driveline is currently operating. Such torque cancellation systems typically pass driveline inputs through signal conditioning filters, which may slow system responsiveness. Slow system response often leads to a "bump" or "overshoot" that occurs when there is an aggressive operator torque request, due to delays in transient responses required to develop filters.

Some systems use a single feedback variable, typically engine speed, and command a single control signal, typically engine torque. However, single feedback/single control vibration control systems do not provide adequate damping in a system having multiple devices operable to generate vibrations in the driveline. As such, other systems employ a multivariate feedback control approach to provide active driveline damping for a hybrid powertrain. This approach provides dynamic coordination of all torque commands to control the transient response of the driveline using the hybrid transmission, including engine torque commands, electric motor torque commands, and clutch torque commands, as well as other controllable torque inputs.

SUMMARY OF THE INVENTION

According to one embodiment of the present invention, a method for regulating a state variable estimator used by a vehicle powertrain is provided. The powertrain is configured to operate in an array of operating modes, such as two wheel drive (2WD), four wheel drive hi (4WDHI), and four wheel drive low (4WDLO). The state estimator provides variable estimates for state variables, such as real-time torque values of axles and dampers, that are not otherwise readily measurable with production powertrain and driveline hardware. This facilitates implementation of other control algorithms, such as torque oscillation damping control schemes which use multivariable feedback. The state estimator is utilized to estimate various control variables for the powertrain system, which includes establishing state space equations operable to estimate the control variable(s) and other operating variables, normally based upon torque inputs. The operating variables generally comprise operating speeds of the powertrain system and driveline. The operating variables are determined, and coefficients of the various equations are adjusted based upon the operating speeds of the powertrain system. The method of the present embodiment determines if the powertrain shifts into a 4WDLO operating mode, and responds to the powertrain being in 4WDLO by resetting the state variable estimator.

According to one aspect of this particular embodiment, resetting the state variable estimator includes resetting an array of current state variables and an array of predicted state variables. The array of current state variables includes a current state engine speed, a current state motor speed, a current state transmission output speed, a current state damper torque, a current state axle torque, or a current state wheel speed, or any combination thereof. Likewise, the array of predicted state variables includes a predicted engine speed, a predicted motor speed, a predicted transmission output speed, a predicted damper torque, a predicted axle torque, or a predicted wheel speed, or any combination thereof.

As part of another aspect of this embodiment, preselected current state variables and predicted state variables are reset to equal a corresponding predetermined reference variable when the state estimator is reset. For example, the predicted and current state speed parameters for one of the powertrain motor/generators are both set equal to a reference motor speed value if the powertrain shifts into 4WDLO. To this regard, the predetermined reference variables generally include a reference engine speed, a reference motor speed, a reference transmission output speed, a reference damper torque, or a reference axle torque, or any combination thereof.

In accordance with another aspect, certain preselected current state and predicted state variables are reset to equal a corresponding measured variable if the powertrain shifts into 4WDLO. By way of example, the predicted and current state wheel speeds are preferably both set equal to a measured wheel speed.

As part of another aspect of this embodiment, the powertrain includes an active driveline damping system. The active damping system has one or more torque-generative devices that are selectively operable to generate a damping torque configured to attenuate vibrations in the powertrain. If the vehicle is in the 4-wheel drive low operating mode, the method of the present embodiment shuts the active damping system off. In a similar respect, the road load compensator is reset to zero if the vehicle is in the 4-wheel drive low operating mode.

According to another embodiment of the present invention, a method is provided for regulating state variable estimators used in a hybrid active damping system for a hybrid powertrain. The hybrid powertrain comprises a plurality of torque-generative devices, such as an internal combustion engine and two motor/generator assemblies, that are operatively connected to a power transmission. The hybrid powertrain is operable to function in an array of different operating modes.

In this embodiment, the method includes: determining if the powertrain is in a 4-wheel drive low operating mode; stopping the active damping system if the vehicle is in the 4-wheel drive low operating mode; and resetting the state variable estimator if the vehicle is in the 4-wheel drive low operating mode; wherein resetting the state variable estimator includes resetting an array of current state variables and an array of predicted state variables calculated therewith.

As part of one aspect of this particular embodiment, resetting the state variable estimator includes setting the predicted and current state engine speeds equal to a reference engine speed, setting the predicted and current state motor speeds equal to a reference motor speed, setting the predicted and current state transmission output speeds equal to a reference transmission output speed, setting the predicted and current state damper torques equal to a reference damper torque, and setting the predicted and current state axle torques equal to a reference axle torque. Correspondingly, resetting the state variable estimator also includes setting the predicted and current state wheel speeds equal to a measured wheel speed.

In accordance with another embodiment of the present invention, a control apparatus for regulating a state variable estimator used in a hybrid active damping system is provided. The active damping system includes at least one torque-generative device that is operable to generate a damping torque configured to attenuate vibrations in a hybrid powertrain. The control apparatus includes a controller that has a storage medium and a programmable memory. The controller is operatively connected to the powertrain, and configured to control operation of the same. The controller is programmed and configured to determine if the powertrain is in a 4-wheel drive low operating mode, and respond to the powertrain being in a 4-wheel drive low operating mode by shutting off the hybrid active damping system and resetting the state variable estimator.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENT

Figure 1:
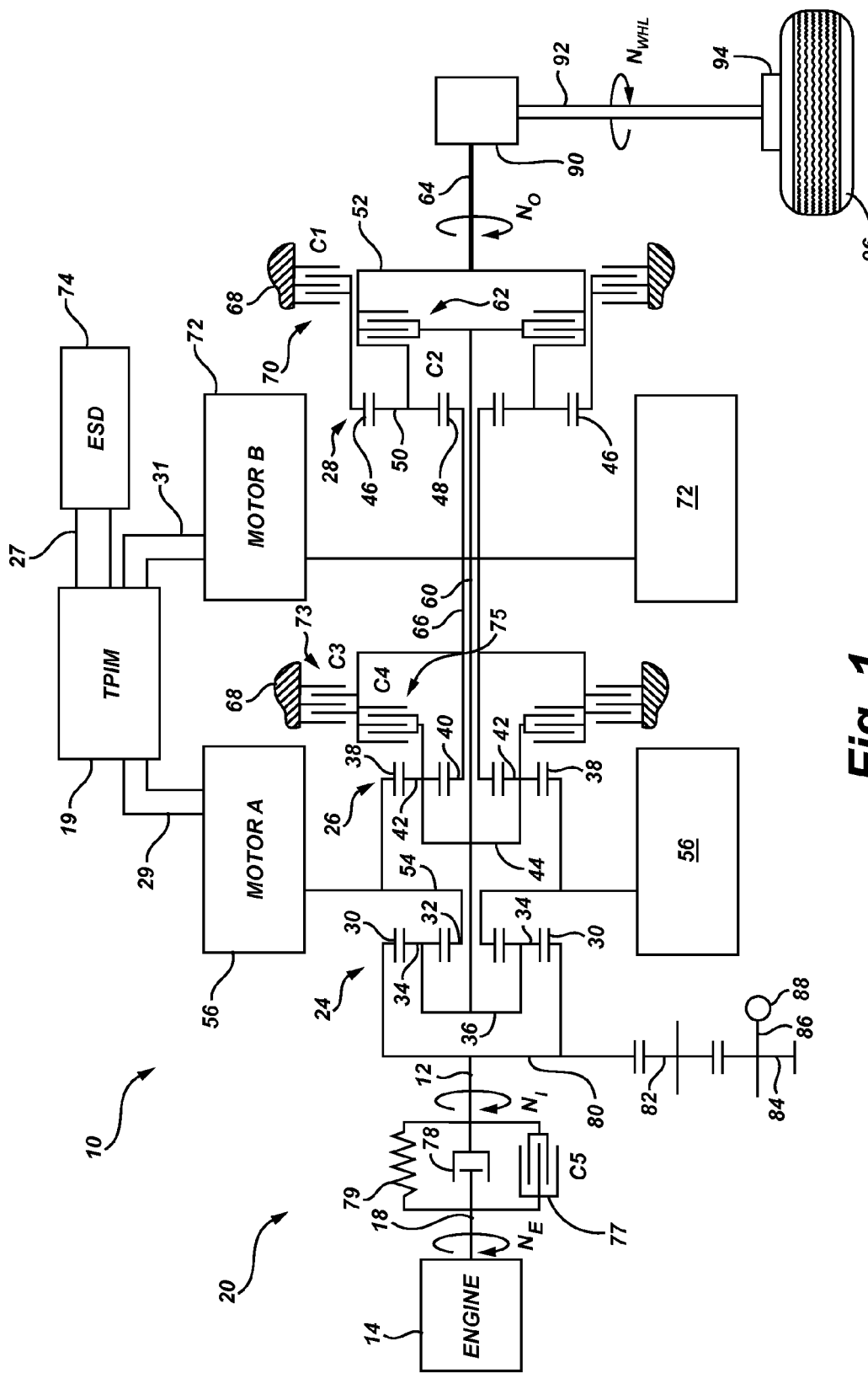
FIG. 1 is a schematic illustration of an exemplary vehicle powertrain for integration and use of the present invention.

Referring to the drawings, wherein like reference numbers refer to like components throughout the several views, FIG. 1 is a schematic representation of an exemplary vehicle powertrain with which the present invention may be utilized. The present invention is described herein in the context of a hybrid-type vehicle having a two-mode, compound-split, power transmission, which is intended solely to offer a representative application by which the present invention may be incorporated and practiced. Accordingly, the present invention is by no means limited to the particular powertrain configuration illustrated in FIG. 1. By way of example, the present invention is applicable to any electric-hybrid vehicle, both series and parallel, full electric vehicles (EV), and any other motorized vehicle powertrain which may benefit from the present invention. Finally, the hybrid vehicle shown in FIG. 1 has been greatly simplified, it being understood that further information regarding the standard operation of a hybrid powertrain, or a hybrid-type vehicle for that matter, may be found in the prior art.

Turning first to FIG. 1, the two-mode, compound-split, power transmission 10 has an input member 12, which may be in the nature of a shaft, for receiving power from a restartable engine 14. The engine 14 transfers power, preferably by way of torque, to the transmission 10 through an engine output member or crankshaft 18. A transient torque damper 20 is interposed between the crankshaft 18 of the engine 14 and the input shaft 12 of the hybrid transmission 10. The exemplary transient torque damper 20 of FIG. 1 comprises a torque transfer device 77 having characteristics of a damping mechanism and a spring, represented respectively at 78 and 79. The transient torque damper 20 permits selective engagement of the engine 14 with the hybrid transmission 10. The torque transfer device 77 preferably comprises a hydraulically operated torque transfer device, which is also referred to herein as friction clutch C5.

In the embodiment depicted in FIG. 1, the engine 14 may be any of numerous forms of reciprocating-piston type internal combustion engines, such as a spark-ignited gasoline engine or a compression-ignited diesel engine, readily adaptable to provide its available power to the transmission 10 at a range of operating speeds, for example, from idle, at or near 600 revolutions per minute (RPM), to over 6,000 RPM. Irrespective of the means by which the engine 14 is connected to the input shaft 12 of the transmission 10, the input shaft 12 is connected to a planetary gear set 24 in the transmission 10.

The transmission 10 is adapted to manipulate and distribute power from the engine 14 to a final drive system, as will be explained in extensive detail hereinbelow. Referring still to FIG. 1, the hybrid transmission 10 utilizes one or more epicyclic gear arrangements, preferably in the nature of three interconnected planetary-gear sets 24, 26 and 28, respectively. The first planetary gear set 24 has an outer gear member 30, typically designated as the "ring gear", which circumscribes an inner gear member 32, which may be generally designated as a "sun gear". A plurality of planetary gear members 34 (also referred to in the art as "pinion gears") are rotatably mounted on a carrier member 36; each planetary gear member 34 is meshingly engaged with both the ring gear member 30 and the sun gear member 32.

The second planetary gear set 26 also has an outer "ring" gear member 38, which circumscribes an inner "sun" gear member 40. The ring gear member 38 is coaxially aligned and rotatable with respect to the sun gear member 40. A plurality of planetary gear members 42 are rotatably mounted on a carrier member 44 such that each planetary gear 42 meshingly engages both the ring gear member 38 and the sun gear member 40.

The third planetary gear set 28, similar to the first and second gear sets 24, 26, also has an outer "ring" gear member 46, which circumscribes an inner "sun" gear member 48. The ring gear member 46 is coaxially aligned and rotatable with respect to the sun gear member 48. A plurality of planetary or pinion gear members 50 are rotatably mounted on a carrier member 52; each planetary gear 50 meshingly engages both the ring gear member 46 and the sun gear member 48.

The three planetary gear sets 24, 26 and 28 each comprise simple planetary gear sets. However, each of the carrier members described above can be either a single-pinion (simple) carrier assembly or a double-pinion (compound) carrier assembly. Furthermore, the first and second planetary gear sets 24, 26 are compounded in that the sun gear member 32 of the first planetary gear set 24 is conjoined, as through a hub plate gear 54, to the ring gear member 38 of the second planetary gear set 26. The conjoined sun gear member 32 of the first planetary gear set 24 and the ring gear member 38 of the second planetary gear set 26 are continuously connected to a first motor/generator 56, also referred to herein as "Motor A".

The first and second planetary gear sets 24, 26 are further compounded in that the carrier member 36 of the first planetary gear set 24 is conjoined, as through an intermediate shaft 60, to the carrier member 44 of the second planetary gear set 26. As such, carrier members 36, 44 of the first and second planetary gear sets 24, 26, respectively, are rigidly attached for common rotation. The intermediate shaft 60 is also selectively connectable to the carrier member 52 of the third planetary gear set 28, as through a second torque transfer device 62 (C2). As will be hereinafter more fully explained, the torque transfer device 62 is employed to assist in the selection of the operational modes of the hybrid transmission 10. The carrier member 52 of the third planetary gear set 28 is connected directly to the transmission output member 64, which is preferably in the nature of a shaft.

In the exemplary embodiment described herein, wherein the hybrid transmission 10 is used as a land vehicle, the transmission output shaft 64 is operatively connected to a final drive system, also referred to herein as "driveline", which is represented herein by a differential 90 or other torque transfer device which provides torque output to one or more vehicular axles 92 or half-shafts (not shown). The axles 92, in turn, deliver torque to drive members, represented herein as vehicle wheel(s) 96. The wheels 96 may be either front or rear wheels of the vehicle on which they are employed, or they may be a drive gear of a track vehicle. The wheels 96 may have some form of wheel brake, represented schematically at 94, associated therewith. The wheels 96 each have a speed variable, $N_{WHL}$, comprising rotational speed of each wheel 96, which is typically measurable with a wheel speed sensor. Although not specifically illustrated in FIG. 1, it should be appreciated that the final drive system may comprise any known configuration, including front wheel drive (FWD), rear wheel drive (RWD), four-wheel drive (4WD), or all-wheel drive (AWD), within the scope of the present invention.

The sun gear member 40 of the second planetary gear set 26 is continuously connected to the sun gear member 48 of the third planetary gear set 28, as through a sleeve shaft 66 that circumscribes intermediate shaft 60. The ring gear member 46 of the third planetary gear set 28 is selectively connected to a stationary member, represented in FIG. 1 by transmission housing 68, through a torque transfer device 70 (also identified as clutch "C1"). Torque transfer device 70, as is hereinafter explained, is also employed to assist in the selection of the operational modes of the hybrid transmission 10. The sleeve shaft 66 is also continuously connected to a second motor/generator 72, also referred to as "Motor B".

All of the planetary gear sets 24, 26, 28, as well as the first and second motor/generators 56, 72, are coaxially oriented, as about the axially disposed intermediate transmission shaft 60. Motor/generators 56, 72 are both of an annular configuration which permits them to generally circumscribe the three planetary gear sets 24, 26, 28. For instance, the planetary gear sets 24, 26, 28 are shown nested inside—i.e., disposed generally radially inwardly of, the first and second motor/generators 56, 72. This configuration assures that the overall envelope, i.e., the circumferential and longitudinal dimensions, of the hybrid transmission 10 are minimized.

A torque transfer device 73 (or clutch "C3") selectively connects the second and third sun gears 40, 48 with the transmission housing 68. A torque transfer device 75 (or clutch "C4") is operative as a lock-up clutch, interlocking the planetary gear sets 24, 26, motor/generators 56, 72, and the shafts 60 and 66 to rotate as a group, by selectively connecting the sun gear 40 with the carrier member 44. In the exemplary embodiment of FIG. 1, the torque transfer devices 62, 70, 73, 75 are all friction clutches. Each clutch is preferably hydraulically actuated, receiving pressurized hydraulic fluid from a pump (not shown). Hydraulic actuation is accomplished using a conventional hydraulic fluid circuit, which is not described in detail herein.

The hybrid transmission 10 receives input motive torque from a plurality of "torque-generative devices", which include the engine 14 and motors/generators 56, 72, as a result of energy conversion from fuel stored in a fuel tank or electrical potential stored in an electrical energy storage device (ESD) 74. That is, the engine 14 and motor/generators A, B operate, individually or in concert, in conjunction with the planetary gear sets and selectively engageable torque transmitting mechanisms highlighted above, to rotate the transmission output shaft 64. The motor/generator assemblies A, B are preferably configured to selectively operate as both a motor and a generator. For instance, the motor/generator assemblies A, B are capable of converting electrical energy to mechanical energy (e.g., during vehicle propulsion), and converting mechanical energy to electrical energy (e.g., during regenerative braking).

The ESD 74 typically comprises a hybrid battery pack, comprising an array of battery modules. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist, and electric range. The ESD 74 is high voltage DC-coupled to transmission power inverter module (TPIM) 19 via DC lines or transfer conductors 27. The TPIM 19 communicates with the first motor/generator 56 by first transfer conductors 29, and the second motor/generator 72 by second transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines 27, and provides alternating current (AC) to the respective motor over transfer conductors 29, 31. In regeneration control, the respective inverter receives AC from the motor over transfer conductors 29, 31 and provides current to the DC lines 27. The net DC current provided to or from the inverters determines the charge or discharge operating mode of the ESD 74. Ideally, Motor A 56 and Motor B 72 are three-phase AC machines, and the inverters comprise complementary three-phase power electronics.

Referring again to FIG. 1, a drive gear 80 may be presented from the input shaft 12. As depicted, the drive gear 80 continuously connects the input shaft 12 to the ring gear member 30 of the first planetary gear set 24. The drive gear 80 receives power from the engine 14, the first motor/generator 56, the second motor/generator 72, or any combination thereof. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off (PTO) unit, designated either individually or collectively at 88, and effectively comprise an accessory load.

Figure 2:
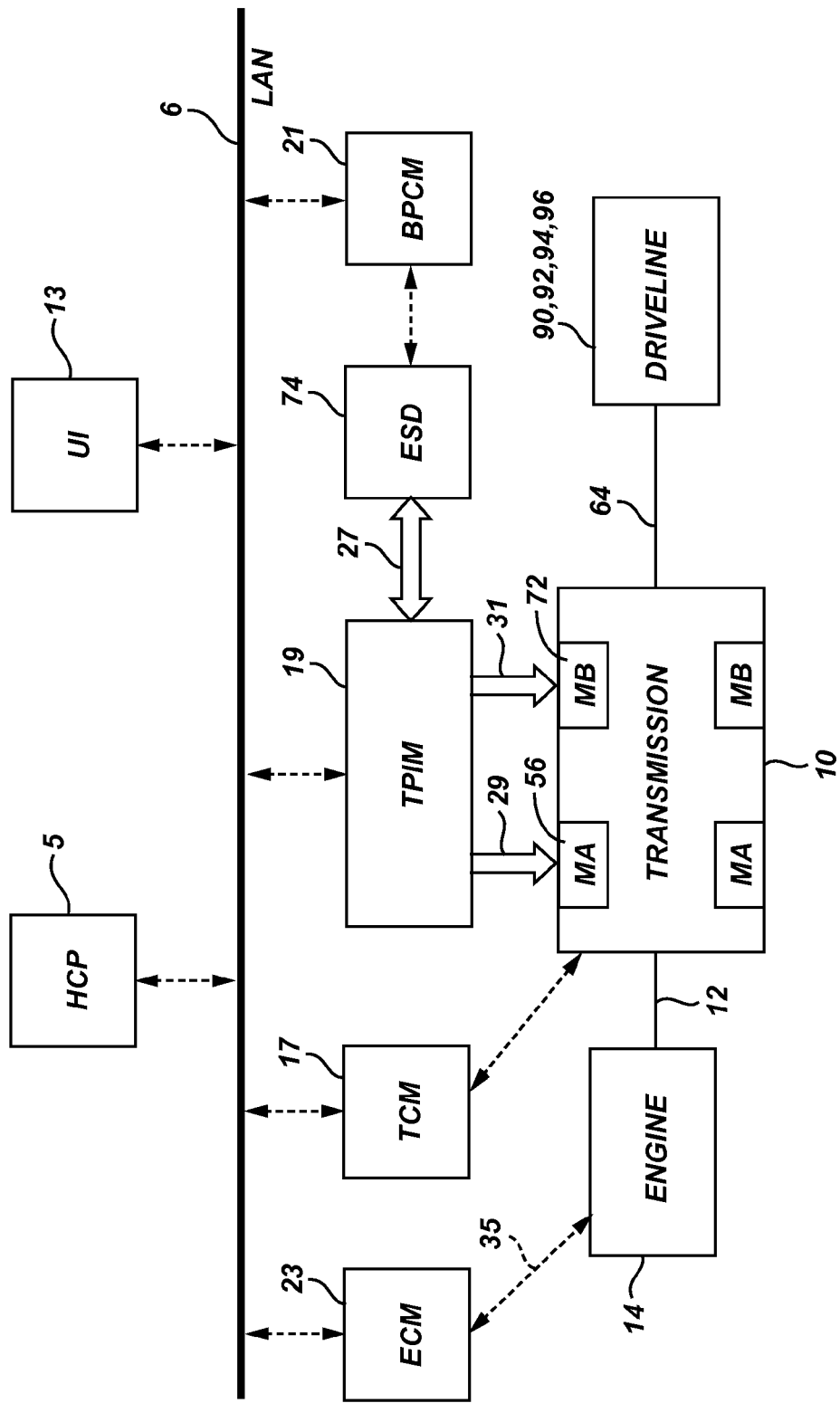
FIG. 2 is a schematic diagram of an exemplary powertrain control apparatus in accordance with the present invention.

Turning to FIG. 2, a schematic block diagram of a control apparatus, comprising a distributed controller architecture, is shown. The control apparatus of FIG. 2 is operable, as described hereinafter, to provide coordinated system control of the powertrain system depicted and described herein. The constituent elements of the control apparatus comprise a subset of an overall vehicle control system. The control system is operable to synthesize pertinent information and inputs, and execute control methods and algorithms, such as the method illustrated in FIG. 5, to control various actuators to achieve control targets, including such parameters as fuel economy, emissions, performance, driveability, and protection of drivetrain hardware, such as, but certainly not limited to, transmission 10, first and second motor/generators 56, 72, and ESD 74.

The distributed controller architecture includes Transmission Control Module (TCM) 17, Transmission Power Inverter Module (TPIM) 19, Battery Pack Control Module (BPCM) 21, and Engine Control Module (ECM) 23. A hybrid control module (HCP) 5 provides overall control and coordination of the aforementioned controllers. A User Interface (UI) 13 is operatively connected to a plurality of devices (not individually shown) through which a vehicle operator typically controls or directs operation of the powertrain, including the transmission 10. Exemplary vehicle operator inputs to the UI 13 include an accelerator pedal, a brake pedal, transmission gear selector, and vehicle speed cruise control. Each of the aforementioned controllers communicates with other controllers, sensors, actuators, etc. via a local area network (LAN) bus 6. The LAN bus 6 allows for structured communication of control parameters and commands between the various controllers. The specific communication protocol utilized is application-specific. By way of example, and certainly not limitation, one communications protocol is the Society of Automotive Engineers standard J1939. The LAN bus 6 and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the TCM 17, TPIM 19, BPCM 21, and ECM 23. Based upon various input signals from the UI 13 and the powertrain, the HCP 5 generates various commands, including, but not limited to, an engine torque command, clutch torque commands, e.g., for the various clutches C1-C4 of the hybrid transmission 10, and motor torque commands, for the Motors A and B.

The ECM 23 is operatively connected to the engine 14. The ECM 23 is configured to acquire data from a variety of sensors and control a variety of actuators, respectively, of the engine 14 over a plurality of discrete lines, shown in aggregate as line 35. The ECM 23 receives an engine torque command from the HCP 5, and generates a desired axle torque, and an indication of actual engine torque, which is communicated to the HCP 5. For simplicity, ECM 23 is shown generally having bidirectional interface with engine 14 via aggregate line 35. Various other variables that may be sensed by the ECM 23 includes engine coolant temperature, engine input speed to the transmission, manifold pressure, and ambient air temperature and pressure. Various actuators that may be controlled by the ECM 23 include, for example, fuel injectors, ignition modules, and throttle control modules.

The TCM 17 is operatively connected to the transmission 10, and functions to acquire data from a variety of sensors and provide command signals to the transmission 10. Inputs from the TCM 17 to the HCP 5 include estimated clutch torques for each of the clutches C1-C4, and rotational speed of the transmission output shaft 64. Additional actuators and sensors may be used to provide additional information from the TCM 17 to the HCP 5 for control purposes.

The BPCM 21 is in signaling communication with a plurality of sensors (not explicitly shown) that are operable to monitor electrical current or voltage parameters of the ESD 74 to provide information about the state and health of the batteries to the HCP 5. Such information includes battery state-of-charge, temperature, and other states of the batteries, including voltage and available power.

With continuing reference to FIG. 2, the TPIM 19 includes a pair of power inverters and motor controllers configured to receive motor control commands and control inverter states therefrom to provide motor drive or regeneration functionality. The TPIM 19 is operable to generate torque commands for Motors A and B, based, at least in part, upon input from the HCP 5, which is driven by operator input through UI 13 and system operating parameters. The predetermined torque commands for Motors A and B are adjusted with motor damping torques to determine motor torques, which are implemented by the control system, including the TPIM 19, to control the motors A and B. Individual motor speed signals for Motor A and Motor B are derived by the TPIM 19 from the motor phase information or conventional rotation sensors. The TPIM 19, in turn, determines and communicates motor speeds to the HCP 5. The electrical energy storage device 74 is high-voltage DC-coupled to the TPIM 19 via DC lines 27. Electrical current is transferable to/from the TPIM 19 in accordance with whether the ESD 74 is being charged or discharged.

Each of the aforementioned controllers is preferably a general-purpose digital computer, generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are preferably executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals—e.g., each 3, 6.25, 15, 25 and 100 milliseconds, during vehicle operation.

In response to operator input, as captured by the UI 13, the supervisory HCP controller 5 and one or more of the other controllers shown in FIG. 2 determine required transmission output torque. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other variables, including such factors as road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

Operation of the hybrid vehicle shown in FIG. 1 may be adversely affected by torque oscillations that occur when abrupt torque changes are encountered in the operation of transmission 10, engine 14, motor/generators 56, 72, or a combination thereof. Such oscillations are encountered, for example, during launching, shifting, and mode changes. The damping of such torque oscillations will enhance vehicle drivability and performance, increase operational life expectancy of the powertrain, and improve operator satisfaction. Coordinated control of the torque-generative devices—i.e., engine 14 and motor/generators 56, 72, may be used to provide such damping.

Figure 3:
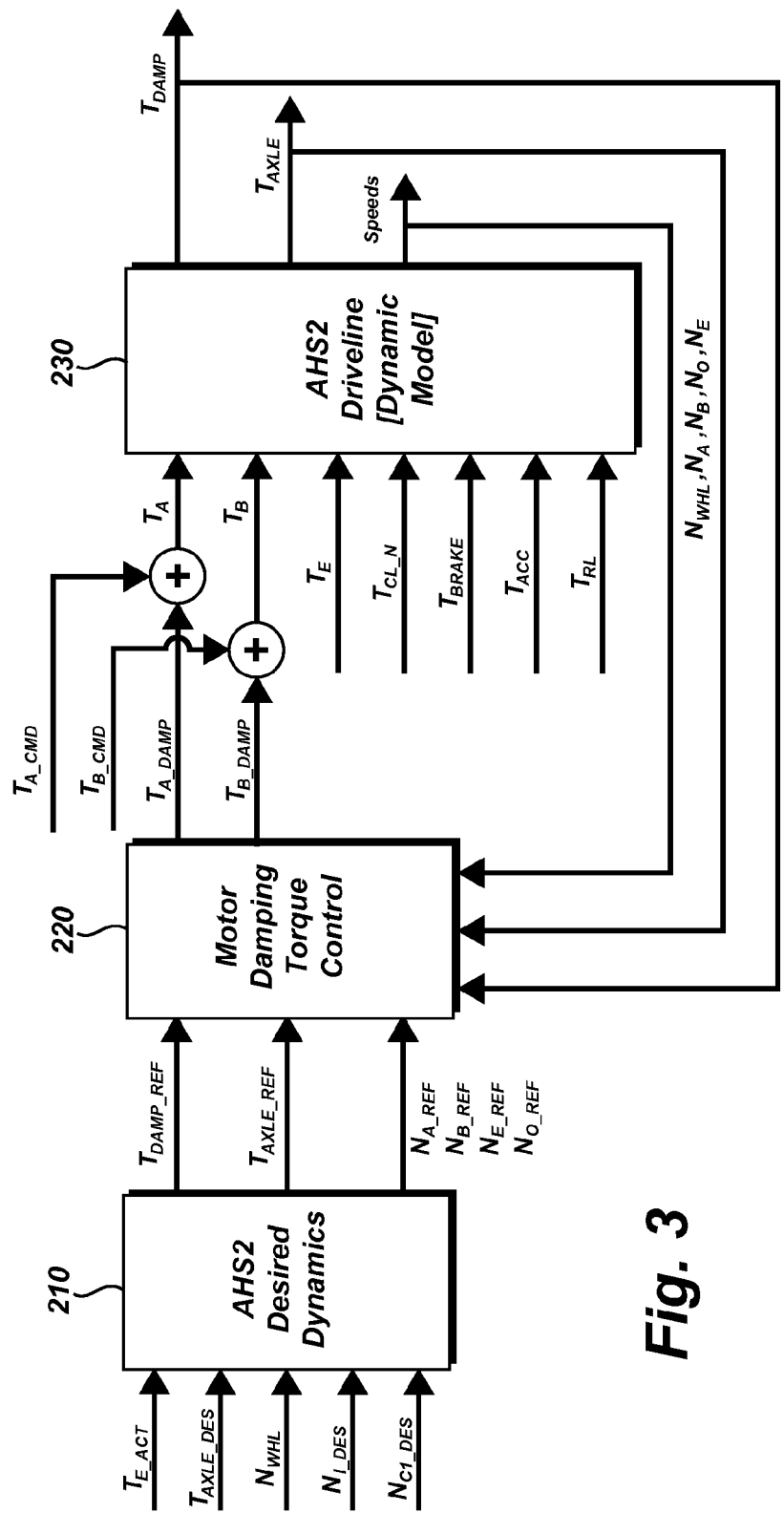
FIG. 3 is a schematic diagram of an exemplary multivariate feedback control scheme in accordance with the present invention.

Referring now to FIG. 3, a control scheme is shown, comprising a multivariate feedback control system that is preferably executed as an algorithm in the controllers of the control system described hereinabove with reference to FIG. 2, to control operation of the system described hereinabove with reference to FIG. 1. The control scheme described hereinafter comprises a subset of overall vehicle control architecture. The control scheme shown in FIG. 3 represents a method and apparatus for multivariate active driveline damping. In general, the multivariate feedback control system comprises an overall operation wherein a plurality of desired system states are translated by desired dynamics 210 to create reference states. The reference states are compared to actual operating states to determine state errors, which comprise a feedback system. The state errors are subjected to a plurality of proportional gain factors to determine plant control inputs, which are input to a physical plant having determinable dynamics, to control actual operating states.

The exemplary multivariate feedback control method and system comprises basic elements for controlling torque outputs from the torque-generative devices 14, 56, 72 through the transmission 10 to the driveline 90, 92, 94, 96. This includes the overall control elements of determining reference variables for a plurality of operating states, based upon current operating conditions and desired operating conditions, through a desired dynamics control scheme 210. The control system determines desired dynamics for the powertrain and driveline by monitoring or determining variables for various operating states, including actual engine torque, $T_{E\_ACT}$, a desired axle torque, $T_{AXLE\_DES}$, average driven-wheel speed, $N_{WHL}$, desired rotational input speed to the transmission, $N_{I\_DES}$, and desired speed at clutch C1, $N_{C1\_DES}$, as shown at 210.

Also included are the overall control elements for determining a plurality of operating state errors, including motor damping torque control, and, executing driveline dynamic control to control each torque-generative device, based upon the operating state errors. The reference variables that are output by the desired dynamics control scheme 210 which define each operating state are used as inputs for the motor damping torque control scheme 220, in conjunction with feedback variables $T_{DAMP}$, $T_{AXLE}$, and speeds, $N_A$, $N_B$, $N_E$, $N_O$, $N_{WHL}$. In this embodiment, the motor damping torque control scheme 220 is operable to determine motor damping torques for controlling the torque-generative devices, i.e. Motor A 56, and Motor B 72, based upon the aforementioned reference variables, and a plurality of operating state errors that comprise feedback from the powertrain and driveline 230, each which have determinable dynamic properties.

A first matrix is formed, generally comprising a single dimensional matrix (or vector) containing the reference variables, $T_{DAMP\_REF}$, $T_{AXLE\_REF}$, $N_{A\_REF}$, $N_{B\_REF}$, $N_{O\_REF}$, $N_{E\_REF}$, $N_{WHL}$. A second matrix is formed, comprising the feedback variables, $T_{DAMP}$, $T_{AXLE}$, and speeds, $N_A$, $N_B$, $N_E$, $N_O$, $N_{WHL}$. The second matrix is multiplied by a gain factor matrix, to calculate a feedback matrix. There is an individual gain factor matrix determined for each transmission operating mode, i.e. the specific operating mode and gear configuration. In this embodiment, the gain factor matrices are determined off-line, and stored as calibration values in one of the on-board controllers.

The outputs from motor damping torque control 220 comprise electrical motor damping torques, $T_{A\_DAMP}$ and $T_{B\_DAMP}$, which are combined with electrical motor commanded torques, $T_{A\_CMD}$ and $T_{B\_CMD}$, to derive motor torque values, $T_A$ and $T_B$. The damping torques, $T_{A\_DAMP}$ and $T_{B\_DAMP}$, may be positive or negative, thus increasing or decreasing the respective commanded torque values. The resultant motor torque values, $T_A$ and $T_B$, are applied by the control system, in conjunction with other driveline dynamic control operations, to control and manage operation of the powertrain and driveline 230. Other input variables to the driveline 230 include engine torque $T_E$, clutch torques $T_{CL\_N}$, to clutches C1-C4 respectively, brake torque $T_{BRAKE}$, accessory load $T_{ACC}$, and road load, $T_{RL}$, and the transmission operating mode. Dynamic operation of the driveline, in response to the aforementioned inputs, will be determined based upon current operating states of the driveline, and specific implementation of the driveline, including various masses and inertial values.

Figure 4:
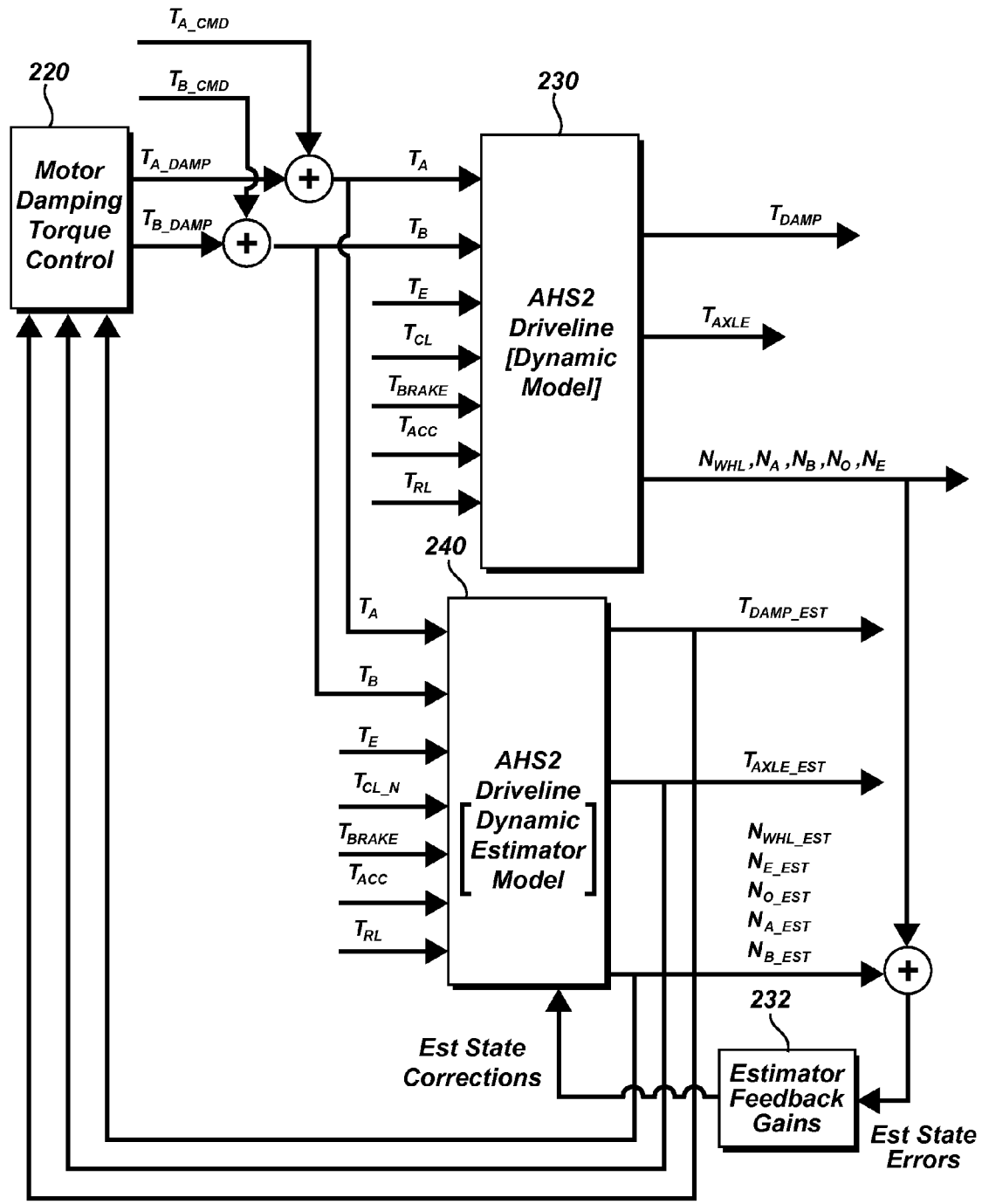
FIG. 4 is a schematic diagram of an exemplary method for estimating state variables for a multivariate driveline in accordance with the present invention.

Turning to FIG. 4, the method and apparatus for estimating state variables for a multivariate driveline having a driveline dynamics estimator 240, is shown. As will be explained in extensive detail hereinbelow with respect to FIG. 5, the driveline dynamics estimator 240, in overall operation, is a mathematical model comprising a plurality of linear equations executed as algorithms within one of the controllers. The mathematical model equations, including calibration values, comprise algorithmic representations of operation of the exemplary driveline described with reference to FIGS. 1 and 2, taking into account application-specific masses, inertias, friction factors, and other characteristics and variables of the driveline that affect various operating states.

The method to estimate state variables for the aforementioned powertrain system includes monitoring operating rotational speed for each of the torque-generative devices, in this case Motor A and Motor B, $N_A$ and $N_B$, respectively, and input speed, $N_E$, from the engine 14 at shaft 12. The output rotational speed of the transmission, $N_O$, is measured at shaft 64. Torque commands, $T_A$, $T_B$, $T_E$, to the torque-generative devices are determined. A plurality of driveline torque loads are also determined and used as inputs. The aforementioned mathematical model equations are executed in one of the controllers to determine an estimated variable for certain vehicle variables, such as $T_{DAMP}$, $T_{AXLE}$, $N_A$, $N_B$, $N_O$, $N_E$, and $N_{WHL}$. As indicated hereinabove with respect to FIG. 3, the control variables (i.e., those variables the control system is acting to control) preferably comprise $T_{DAMP}$ and $T_{AXLE}$, whereas the operating variables (i.e., those variables the control system is able to measure using sensing systems on the powertrain system) preferably comprise $N_A$, $N_B$, $N_O$, $N_E$, and $N_{WHL}$.

The exemplary driveline dynamics estimator 240 uses as inputs various variables, which may include, purely by way of example, the torque commands to the torque-generative devices, and the torque loads to estimate control variables (e.g., $T_{DAMP}$ and $T_{AXLE}$). Certain state space equations are executed as a matrix in the estimator 240, which is operable to estimate the control variables and operating variables. In addition to the operating speeds $N_A$, $N_B$, $N_O$, $N_E$, and $N_{WHL}$, the operating variables comprise torque inputs including motor torque values, $T_A$ and $T_B$, engine torque $T_E$, clutch torques $T_{CL\_N}$, to clutches C1-C4, brake torque $T_{BRAKE}$, accessory load $T_{ACC}$, and road load, $T_{RL}$. Variables for the operating speeds are estimated. The difference between the measured operating speeds and estimated operating speeds is determined, and coefficients for the plurality of equations are adjusted based upon the determined differences in operating speeds of the powertrain system.

The distributed controller architecture described with reference to FIG. 2, and the algorithmic structure described herein is preferably executed in a manner that causes the estimation of the aforementioned variables to be achieved in real-time—i.e., there is limited or no lag time in determining the various states. To this regard, the control system preferably executes the algorithms in a minimum quantity of controller clock cycles to ensure that changes to the control variables occur at a frequency substantially less than the dynamics of the system.

Input variables to the driveline dynamics estimator 240 include motor torque values, $T_A$ and $T_B$, engine torque $T_E$, clutch torques $T_{CL\_N}$, brake torque $T_{BRAKE}$, accessory load $T_{ACC}$, and road load, $T_{RL}$, as well as the transmission's operating mode. The aforementioned inputs are applied to the matrix equation to dynamically calculate estimated output state variables of the driveline, including $T_{DAMP\_EST}$, $T_{AXLE\_EST}$, $N_{A\_EST}$, $N_{B\_EST}$, $N_{O\_EST}$, $N_{E\_EST}$, and $N_{WHL\_EST}$, based upon the input variables. A first matrix comprising the estimated speeds (e.g., $N_{A\_EST}$, $N_{B\_EST}$, $N_{O\_EST}$, $N_{E\_EST}$, and $N_{WHL\_EST}$) is subtracted from a second matrix comprising measured speeds $N_A$, $N_B$, $N_O$, $N_E$, $N_{WHL}$. The resultant matrix is multiplied by one of a plurality of gain matrices, executed in block 232, to determine a matrix of estimated state corrections, or coefficients. As previously noted, each of the gain matrices comprises a matrix of scalar gain factors, preferably determined for each transmission operating mode—i.e., the specific operating mode and gear configuration.

The matrix of estimated state corrections output from block 232 is used as feedback by the driveline dynamics estimator 240 in determining the dynamically calculated estimated output states of the driveline. When the matrix comprising the estimated speeds $N_{A\_EST}$, $N_{B\_EST}$, $N_{O\_EST}$, $N_{E\_EST}$, and $N_{WHL\_EST}$ is equal to the matrix comprising measured speeds $N_A$, $N_B$, $N_O$, $N_E$, $N_{WHL}$, it is determined that the outputs of the estimator, comprising $T_{DAMP\_EST}$, $T_{AXLE\_EST}$, $N_{A\_EST}$, $N_{B\_EST}$, $N_{O\_EST}$, $N_{E\_EST}$, and $N_{WHL\_EST}$ are accurate measurements of actual operating states of the driveline. The outputs of the estimator are also used as a feedback matrix to the multivariate motor damping control scheme 220 to control Motor A and Motor B. Therefore, the feedback control model shown in FIG. 4 effectively replaces the feedback control model shown in FIG. 3, for controlling driveline dynamics in the exemplary system.

Figure 5:
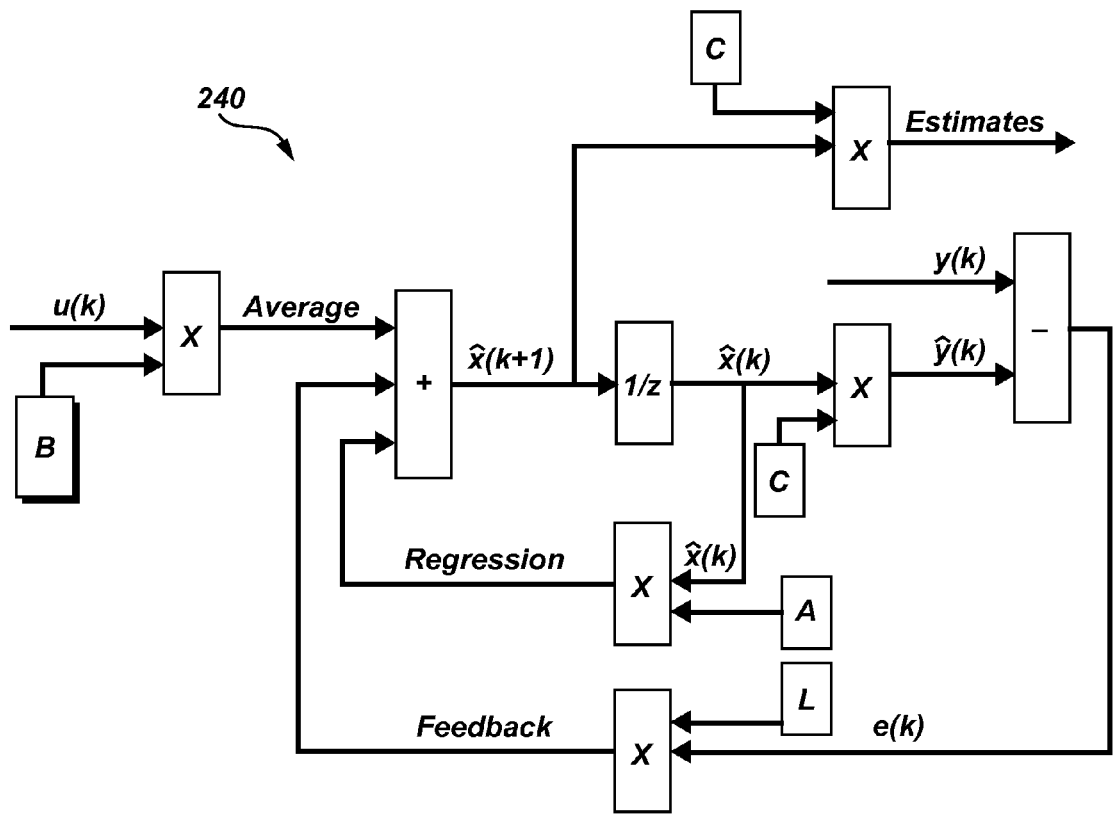
FIG. 5 is a schematic diagram of an exemplary driveline dynamics estimator in accordance with the present invention.

FIG. 5 of the drawings is a schematic diagram of the exemplary driveline dynamics estimator 240 discussed above with respect to FIG. 4. In general operation, the various input variables, such as engine torque, $T_E$, torque from Motor A, $T_A$, torque from Motor B, $T_B$, brake torque $T_{BRAKE}$, accessory load, $T_{ACC}$, road load, $T_{RL}$, clutch torques $T_{CL\_N}$, which are collectively represented in FIG. 5 by current sample input u(k), are multiplied by an n-by-m matrix of gains, Matrix B, which will also be referred to herein as the "input matrix", to generate average state variables, Bu(k). The average state variables are then added to "regression" and "feedback" values, which will be explained in the discussion to follow, to generate predicted state variables $\hat{x}(k+1)$.

In a typical state space model for a discrete system, the predicted state variables x(k+1) is equal to Ax(k)+Bu(k), where the actual, measured value for that sample y(k) is equal to Cx(k)+Du(k). Similar to input matrix B discussed above, A, C and D each represent individual n-by-m gain matrices, whereas k indicates the current sample. In this embodiment, Matrix A is referred to as a "transition matrix", Matrix C is referred to as an "output matrix", and Matrix D is referred to as an "input-output relationship matrix". In a state space model for a discrete observer with D equal to zero (0), which is represented in FIG. 5, the predicted state $\hat{x}(k+1)$ is equal to $A\hat{x}(k)+Le(k)+Bu(k)$, where the error $e(k)$ is equal to $y(k)-\hat{y}(k)$ with the estimated output value $\hat{y}(k)$ equal to $C\hat{x}(k)$. The predicted state variables $\hat{x}(k+1)$ are multiplied by the output matrix C, to provide estimated output state variables of the driveline, which include, for example, $T_{DAMP\_EST}$, $T_{AXLE\_EST}$, $N_{A\_EST}$, $N_{B\_EST}$, $N_{O\_EST}$, $N_{E\_EST}$, $N_{WHL\_EST}$, and $N_{VEH\_EST}$, all of which are output from the dynamic estimator 240, as seen in FIG. 4

The implementation of the state estimator 240 includes a delay block (k+1) for all of the states such that it breaks the algebraic loop within the simulation software. In addition, in order to line up all commands to the motor commands which are from the last loop, all other signals into the estimator are delayed by one time step to align all inputs in time. Since this is done, the estimates are taken from before the algebraic loop delay rather than after as in a typical state space controls design. Setting the current state equal to the predicted state is indicated in FIG. 5 by the delay 1/z—i.e., to generate the current state variables $\hat{x}(k)$ (which may also be referred to as "delayed predicted signals").

The current state variables $\hat{x}(k)$ are fed back into the state estimator 240, multiplied by the transition matrix, gain Matrix A, to generate the aforementioned regression values, $A\hat{x}(k)$. The current state variables $\hat{x}(k)$ are also multiplied by the output matrix, gain Matrix C, to generate the estimated output variables $\hat{y}(k)$. The dynamics estimator 240 then operates to determine state errors, $e(k)$, subtracting the actual, measured values $y(k)$ from the estimated output variables $\hat{y}(k)$. The state errors $e(k)$ are multiplied by the feedback matrix, gain Matrix L, to generate feedback values, $Le(k)$. It can then be seen how the predicted state variables $\hat{x}(k+1)$ is equal to the average state variables, $Bu(k)$, plus the regression values, $A\hat{x}(k)$, plus the feedback values $Le(k)$.

Figure 6:
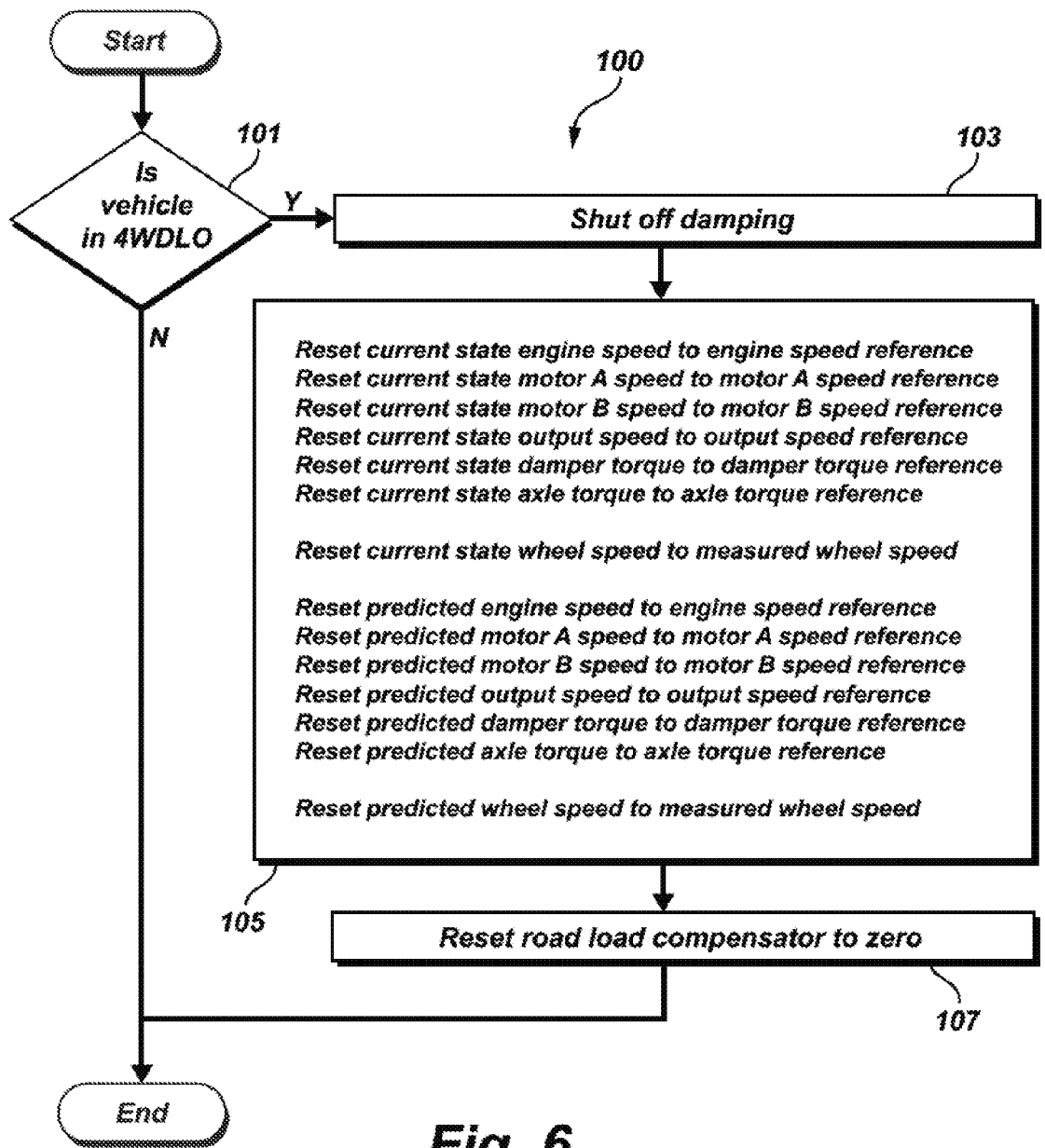
FIG. 6 is a flow chart or block diagram illustrating a control algorithm or method for resetting a hybrid active driveline damping state estimator in accordance with a preferred embodiment of the present invention.

With reference now to the flow chart shown in FIG. 6, an algorithm for multivariate active driveline damping, namely an improved method for regulating state variable estimators used in hybrid active damping for a hybrid powertrain, is shown generally at 100 in accordance with a preferred embodiment of the present invention. The method or algorithm 100 is described herein with respect to the structure illustrated in FIGS. 1 and 2, preferably executed as algorithms in the controllers of the control system described hereinabove with reference to FIG. 2, to control operation of the system described with reference to FIG. 1. However, the present invention may also be incorporated into other vehicle configurations, and applied to other powertrain arrangements. In addition, the method 100 preferably includes at least steps 101-107. However, it is within the scope and spirit of the present invention to omit steps, include additional steps, and/or modify the order presented in FIG. 6. It should be further noted that the method 100 represents a single operation. However, it is expected, as indicated above, that the method 100 be applied in a systematic and repetitive manner.

During operation of the hybrid powertrain 10, the HCP continuously monitors the current powertrain operating state. As noted above, the powertrain is configured to operate in an array of operating modes, such as two wheel drive (2WD), four wheel drive hi (4WDHI), and four wheel drive low (4WDLO). The method 100 determines, in step 101, if the powertrain shifts into or is currently operating in a 4WDLO operating mode. If the powertrain is not operating in 4WDLO (i.e., step 101=no), the method 100 ends, and repeats in a systematic manner. If, however, the powertrain is operating in 4WDLO (i.e., step 101=yes), the HCP 5 will respond by resetting the state estimator. In doing so, the present invention reduces the number of calibrations required by the Hybrid Active Damping Ring (HADR). During normal operation, the HADR state estimator runs continuously, and is normally never disabled. Without correct state space calibrations for the 4WDLO operating mode, the estimate variables would diverge from the real variables (e.g., speed and torque) in 4WDLO. The present invention allows the estimator to continue to track near the actual speeds and torques so that when the system switches out of 4WDLO, the estimator does not have to correct for very large errors even when estimator calibrations for 4WDLO are omitted.

Prior to, contemporaneously with resetting the state estimator, the active damping system is turned off in step 103 when the operator selects the 4WDLO mode. This in effect sets the damping torques to zero.

According to the preferred embodiment illustrated in FIG. 6, resetting the state variable estimator includes resetting the current state variables $\hat{x}(k)$ and predicted state variables $\hat{x}(k+1)$, shown as step 105. By way of example, and certainly not limitation, the current state variables $\hat{x}(k)$ include a current state speed for engine 14, a current state speed for both Motor A and Motor B, a current state output speed for transmission 10, a current state damper torque, a current state axle torque, and a current state speed for wheels 96. Note, the damper torque is an indication of how much "twist" is in the damper spring located between the engine and transmission. Likewise, the predicted state variables $\hat{x}(k+1)$ include a predicted speed for engine 14, a predicted speed for both Motor A and Motor B, a predicted output speed for transmission 10, a predicted damper torque, a predicted axle torque, and a predicted speed of wheel 96.

In order to reset the state estimator, preselected current state variables and predicted state variables are reset to equal a corresponding predetermined reference variable when the state estimator is reset. Specifically, the predicted and current state engine speeds are set equal to a reference engine speed, the predicted and current state motor speeds are set equal to a reference motor speed, the predicted and current state transmission output speeds are set equal to a reference transmission output speed, the predicted and current state damper torques are set equal to a reference damper torque, and the predicted and current state axle torques are set equal to a reference axle torque. Likewise, certain preselected current state and predicted state variables are reset to equal a corresponding measured variable when the powertrain shifts into 4WDLO. By way of example, the predicted and current state wheel speeds are preferably both set equal to a measured wheel speed.

Prior to, contemporaneously with, or after steps 101 and 105, the method 100 of the present embodiment resets the road load compensator to zero if the vehicle is in the 4-wheel drive low operating mode. The road load compensator is calculated using a proportional integrator control algorithm that uses the difference between the measured wheel speed and estimated wheel speed to calculate a road load compensated torque, which is used in the state estimator to calculate a wheel speed estimate value. This compensated torque will drive the estimated wheel speed to the actual wheel speed value. A typical example is when the vehicle is on a grade, where the road load compensated torque will equal the axle torque of the vehicle (with the vehicle at rest), and may also adjust for torque within the system that is not reported accurately.

While the best modes for carrying out the present invention have been described in detail, those familiar with the art to which this invention pertains will recognize various alternative designs and embodiments for practicing the invention within the scope of the appended claims.

The invention claimed is:

1. A method for regulating a state variable estimator used by a vehicle powertrain operable to function in an array of operating modes, wherein the powertrain includes an active damping system having at least one torque-generative device selectively operable to generate a damping torque configured to attenuate vibrations in the powertrain, the method comprising:
    determining if the powertrain is in a 4-wheel drive low operating mode;
    stopping the active damping system if the vehicle is in the 4-wheel drive low operating mode; and
    resetting the state variable estimator if the vehicle is in the 4-wheel drive low operating mode.

2. The method of claim 1, wherein said resetting the state variable estimator includes resetting an array of current state variables and an array of predicted state variables.

3. The method of claim 2, wherein said array of current state variables includes at least one of a current state engine speed, a current state motor speed, a current state transmission output speed, a current state damper torque, a current state axle torque, and a current state wheel speed.

4. The method of claim 2, wherein said array of predicted state variables includes at least one of a predicted engine speed, a predicted motor speed, a predicted transmission output speed, a predicted damper torque, a predicted axle torque, and a predicted wheel speed.

5. The method of claim 2, wherein preselected ones of said array of current state variables and preselected ones of said array of predicted state variables are reset to equal an array of predetermined reference variables.

6. The method of claim 5, wherein said array of predetermined reference variables includes at least one of a reference engine speed, a reference motor speed, a reference transmission output speed, a reference damper torque, and a reference axle torque.

7. The method of claim 2, wherein preselected ones of said array of current state variables and preselected ones of said array of predicted state variables are reset to equal a corresponding measured variable.

8. The method of claim 1, further comprising:
    resetting a road load compensator to zero if the vehicle is in the 4-wheel drive low operating mode.

9. A method for regulating a state variable estimator used in a hybrid active damping system for a hybrid powertrain having a plurality of torque-generative devices operatively connected to a power transmission, the powertrain being operable to function in an array of operating modes, the method comprising:
    determining if the powertrain is in a 4-wheel drive low operating mode;
    stopping the active damping system if the vehicle is in the 4-wheel drive low operating mode; and
    resetting the state variable estimator if the vehicle is in the 4-wheel drive low operating mode;
    wherein resetting the state variable estimator includes resetting an array of current state variables and an array of predicted state variables.

10. The method of claim 9, wherein said array of current state variables includes a current state engine speed, a current state motor speed, a current state transmission output speed, a current state damper torque, a current state axle torque, and a current state wheel speed.

11. The method of claim 10, wherein said array of predicted state variables includes a predicted engine speed, a predicted motor speed, a predicted transmission output speed, a predicted damper torque, a predicted axle torque, and a predicted wheel speed.

12. The method of claim 11, wherein resetting the state variable estimator includes setting said predicted and current state engine speeds equal to a reference engine speed, setting said predicted and current state motor speeds equal to a reference motor speed, setting said predicted and current state transmission output speeds equal to a reference transmission output speed, setting said predicted and current state damper torques equal to a reference damper torque, and setting said predicted and current state axle torques equal to a reference axle torque.

13. The method of claim 11, wherein resetting the state variable estimator includes setting said predicted and current state wheel speeds equal to a measured wheel speed.

14. The method of claim 9, further comprising:
    resetting a road load compensator to zero if the vehicle is in the 4-wheel drive low operating mode.

15. A control apparatus for regulating a state variable estimator used in a hybrid active damping system having at least one torque-generative device operable to generate a damping torque configured to attenuate vibrations in a hybrid powertrain operable to function in an array of operating modes, the apparatus comprising:
    a controller having a storage medium and a programmable memory, said controller being in operative communication with the powertrain and configured to control operation of the powertrain;
    wherein said controller is programmed and configured to determine if the powertrain is in a 4-wheel drive low operating mode, and respond to the powertrain being in a 4-wheel drive low operating mode by shutting off the hybrid active damping system and resetting the state variable estimator.

* * * * *